FIG. 1. Equilibrium of racemic sodium glutamate and sodium sulfate in aqueous solution (g in 100g of $H_2O$)

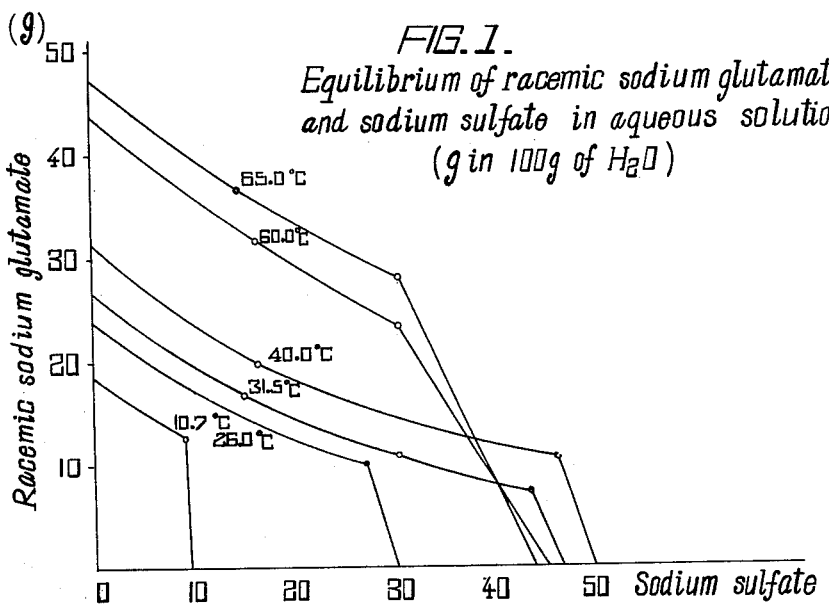

[Sodium sulfate is precipitated in solid phase as $Na_2SO_4 \cdot 10H_2O$ when the temperature is below 31.5°C and as $Na_2SO_4$ anhydrate above said temperature]

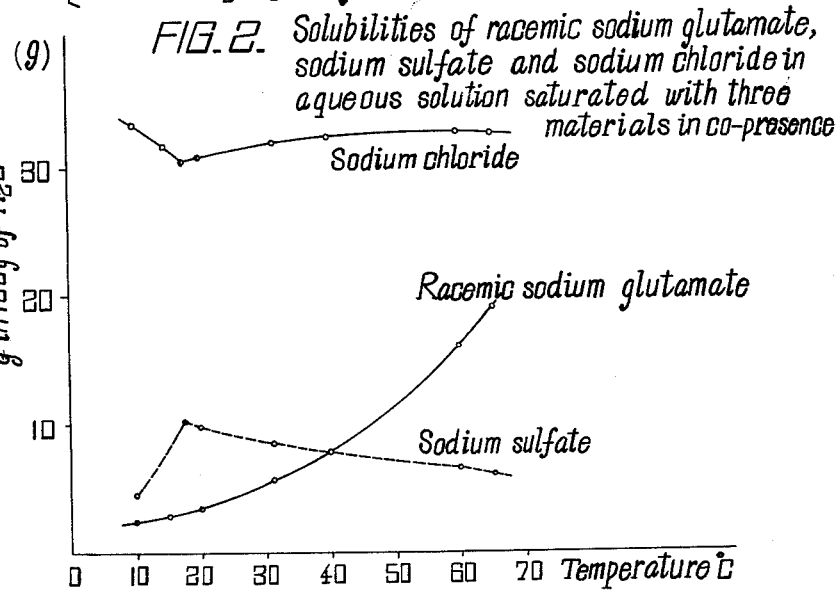

FIG. 2. Solubilities of racemic sodium glutamate, sodium sulfate and sodium chloride in aqueous solution saturated with three materials in co-presence

United States Patent Office 3,156,721
Patented Nov. 10, 1964

3,156,721
METHOD FOR SEPARATING RACEMIC SODIUM GLUTAMATE AND SODIUM SULFATE
Hiroo Kageyama, Isogo-ku, Yokohama-shi, Michiya Sato, Tokyo, and Tetuya Inoue, Kawasaki-shi, Kanagawa-ken, Japan, assignors to Ajinomoto Kabushiki Kaisha, Tokyo, Japan, a corporation of Japan
Filed Apr. 8, 1960, Ser. No. 21,037
Claims priority, application Japan, Apr. 28, 1959, 34/13,287
4 Claims. (Cl. 260—534)

The present invention relates to methods for precipitating racemic sodium glutamate and sodium sulfate separately from an aqueous solution containing racemic sodium glutamate and sodium sulfate, and particularly to methods for separating racemic sodium glutamate and sodium sulfate from an aqueous solution containing these two materials by adding sodium chloride to the solution at an elevated temperature so as to saturate the solution with sodium chloride, filtering precipitated sodium sulfate off, cooling the filtrate to room temperature and recovering precipitated racemic sodium glutamate.

An object of the present invention is to provide a method which facilitates recovering racemic sodium glutamate in a high yield as crystals which do not contain sodium sulfate from an aqueous solution containing racemic sodium glutamate and sodium sulfate.

In glutamic acid synthesis, a solution containing racemic glutamic acid together with sulfuric acid or sodium hydroxide may be obtained, and from said solution, racemic glutamic acid is obtained as precipitated crystals by neutralizing said solution with sodium hydroxide or sulfuric acid. However, by this process, only about 70–80% of the racemic acid contained in said solution is recovered and the mother liquor still contains a substantial amount of racemic glutamic acid together with a great amount of sodium sulfate. For the recovery of racemic glutamic acid from said mother liquor, further NaOH is added to convert racemic glutamic acid into racemic sodium glutamate for it is difficult to separate racemic glutamic acid in acid form in a high yield from a solution containing a small quantity of racemic glutamic acid together with a great amount of sodium sulfate. After this conversion, the separation of racemic sodium glutamate from the aqueous solution containing racemic sodium glutamate and sodium sulfate is effected. This separation of racemic sodium glutamate and sodium sulfate from said solution is one of the important steps pertaining to the production of sodium glutamate. Nevertheless, no literature is available on this important aspect.

According to the invention, a method is now available which makes it possible to separate racemic sodium glutamate and sodium sulfate in a high yield from an aqueous solution containing racemic sodium glutamate and sodium sulfate by a simple operation.

The present invention will next be explained with reference to the accompanying drawings wherein:

FIG. 1 is a graph including curves showing the relative solubilities of racemic sodium glutamate and sodium sulfate in an aqueous solution for at various temperatures, in other words, equilibriums between racemic sodium glutamate and sodium sulfate in an aqueous solution containing said two materials in co-existence at various temperatures; and FIG. 2 shows curves illustrating the solubilities of racemic sodium glutamate, sodium sulfate and sodium chloride in aqueous solution saturated with all three of these materials.

When it is desired to isolate a certain material from a solution containing said material together with other materials by utilizing the difference between the solubilities of these materials at various temperatures, in general, it is convenient if the solubility of the material to be isolated has a steep temperature gradient and is low at room temperature while the solubilities of other materials should have mild temperature gradients. However, in the case of an aqueous solution of racemic sodium glutamate and sodium sulfate, the convenient conditions described above are not afforded. The following table shows the respective solubilities of racemic sodium glutamate and sodium sulfate in water at various temperatures.

TABLE 1
[Quantities dissolved in 100 g. of water]

| Temperature, °C. | Racemic sodium glutamate, g. | Sodium sulfate, g. |
|---|---|---|
| 60 | 44.1 | 45.3 |
| 32 | 27.2 | 49.7 |
| 20 | 22.1 | 19.1 |
| 10 | 18.7 | 9.1 |

From the above table it is noted that the solubility of sodium sulfate in water decreases very rapidly as the temperature is lowered below 32° C. while racemic sodium glutamate has a relatively high solubility even at room temperature and its temperature gradient is relatively mild around room temperature. Under such conditions, it is natural not to expect that racemic sodium glutamate can be recovered as crystals without sodium sulfate by cooling the saturated solution containing the two materials.

It has been found, however, contrary to expectation, that the separation of racemic sodium glutamate and sodium sulfate can be effected in the presence of sodium chloride.

There is no literature on the equilibrium of racemic sodium glutamate and sodium sulfate in water.

According to tests which we have conducted, the equilibrium between the two materials in water at various temperatures are shown in FIG. 1.

For example, when an aqueous solution saturated with said two materials at 65° C. is cooled to 31.5° C., racemic sodium glutamate in an amount corresponding to 29.1−11.8=17.3 g./100 g. water will be crystallized out since said material is dissolved at a ratio of 29.1 g./100 g. water at 65° C. and 11.8 g./100 g. water at 31.5° C., respectively.

In this case, no sodium sulfate is precipitated since the solubility thereof in the solution is higher at 31.5° C. than that at 65° C. and the crystals obtained do not contain sodium sulfate. However it is noted that the solution still contains racemic sodium glutamate at the high concentration of 11.8 g./100 g. water and the yield is as low as 17.3/29.1=59.4%. Such a result is not satisfactory. Furthermore, it is noted from FIG. 1 that when the temperature is further lowered, for instance, to 26° C., a precipitation of sodium sulfate occurs thereby disturbing the separation of racemic sodium glutamate.

We have been able to eliminate these disadvantages by the simple addition of sodium chloride to an aqueous solution containing racemic sodium glutamate and sodium sulfate.

In tests which we have conducted, racemic sodium glutamate, sodium sulfate and sodium chloride were added to 300 g. of water in a three-necked flask provided with a thermometer, an efficient coil-type condenser and a mercury sealed stirrer. The amounts of the three materials were sufficient that they remained in solid phase at the temperatures of tests. The contents of the flask were stirred at said temperature for five hours, and the supernatant solution was analyzed. Such tests were carried out at various temperatures. The results obtained are shown in FIG. 2.

In FIG. 2, it will be seen that, at 50° C., sodium sulfate is present in an amount which is at least 0.6 times that of racemic sodium glutamate by weight. It will also be seen from FIG. 2 that the starting solution contains more than 2 g./100 g. $H_2O$ of racemic sodium glutamate according to the solubility of racemic sodium glutamate at 10° C.

The starting solution of 50° C. contains more than 11 g./100 g. $H_2O$ of racemic sodium glutamate and more than 7 g./100 g. $H_2O$ of $Na_2SO_4$ as can be seen from the solubilities of racemic sodium glutamate and $Na_2SO_4$ in FIG. 2.

An addition of more than 33 g./100 g. $H_2O$ of NaCl is required as can also be seen from the solubility of sodium chloride in FIG. 2.

NaCl is added in an amount of less than 3 times the amount of sodium glutamate as also can be obtained from the solubility ratio between racemic sodium glutamate and NaCl at 50° C.

It is also to be noted from FIG. 2 that the solubility of racemic sodium glutamate has a steep temperature gradient and is low enough at room temperature for precipitating the said material in a high yield. It is also noted that the solubilities of sodium sulfate and sodium chloride coexisting with racemic sodium glutamate have reasonably gentle temperature gradients so that it is possible to effect the separation of racemic sodium glutamate in a wide range of temperatures.

For example, the amounts of racemic sodium glutamate, sodium sulfate and sodium chloride dissolved in 100 g. of water at 65° C. and 15° C. are shown in the following table.

TABLE 2

| Temperature, ° C. | R.-sodium glutamate, g. | Sodium sulfate, g. | Sodium chloride, g. |
| --- | --- | --- | --- |
| 65 | 19.1 | 6.1 | 32.6 |
| 15 | 3.0 | 8.3 | 32.0 |

It is noted from the above table that when 157.8 g. of saturated aqueous solution containing racemic sodium glutamate, sodium sulfate and sodium chloride at 65° C. is cooled to 15° C., racemic sodium glutamate is precipitated in the amount of 16.1 g. (that is 19.1 g.—3.0 g.) corresponding to the yield of $$\frac{16.1}{19.1} = 84.3\%$$

while no precipitation of sodium sulfate occurs. The advantage to be secured by the addition of sodium chloride will be appreciated more clearly from the following explanation which assumes a solution containing 27 g. of racemic sodium glutamate and 84 g. of sodium sulfate in 300 g. of water. From FIG. 1, it is noted that the said solution is not saturated with racemic sodium glutamate but is saturated with sodium sulfate at 26° C. Consequently it is evident that it is difficult under the conditions to obtain racemic sodium glutamate in crystal form without sodium sulfate from the solution by merely cooling. After adding 46.9 g. of sodium chloride, the temperature of the solution is elevated to 65° C. and 156 g. of water is evaporated from the solution at the same temperature. The solution thus obtained is to be the solution saturated with the said materials at 65° C. From FIG. 2, therefore, it is noted that 75.2 g. of sodium sulfate will be precipitated during evaporation of water since the solution at 65° C. contains 27 g. of racemic sodium glutamate, 8.8 g. of sodium sulfate and 46.9 g. of sodium chloride in 144 g. of water. When the said solution is cooled to 15° C. after removing the precipitates at 65° C., racemic sodium glutamate is precipitated in 84.3% yield as can be seen from table 2. Thus it is clear that the addition of sodium chloride brings about great advantages in increasing the yield and the purity of the product, and in facilitating the isolation of the product in comparison with the case of no addition of sodium chloride.

*Example 1*

An aqueous solution containing racemic sodium glutamate dihydrate, sodium sulfate and sodium chloride in solid phase was agitated for five hours at 65° C., and the saturated aqueous solution of these materials was prepared by filtering off solid materials undissolved at the same temperature. The composition of the filtrate was as follows:

|  | Percent |
| --- | --- |
| Racemic sodium glutamate | 12.12 |
| Sodium sulfate | 3.89 |
| Sodium chloride | 20.64 |

417 g. of this solution were cooled to 10° C. and were agitated for 5 hours. Precipitated crude racemic sodium glutamate dihydrate (65.5 g.) and the mother liquor (345 g.) were analyzed and the following results were obtained.

| Crude racemic sodium glutamate dihydrate (65.5): | Percent |
| --- | --- |
| Racemic sodium glutamate dihydrate | 78.0 |
| Sodium sulfate | 1.0 |
| Sodium chloride | 8.3 |
| Adhered moisture | 12.7 |

| Mother liquor (345 g.): |  |
| --- | --- |
| Racemic sodium glutamate | 2.28 |
| Sodium sulfate | 4.49 |
| Sodium chloride | 23.1 |

From the above, it is noted that racemic sodium glutamate was precipitated in 83.4% yield even if the content in the mother liquor is set aside, and further that sodium sulfate is substantially absent as crystals in the precipitated crystals, the small amount in the analysis being that contained in the adhering mother liquor.

*Example 2*

A solution in the amount of 1670 g. containing 50 g. of racemic sodium glutamate and 300 g. of sodium sulfate was used as the starting material. (This solution was obtained by neutralizing a solution containing racemic glutamic acid and sulfuric acid with NaOH to a pH of 3.2 to precipitate about 80% of racemic glutamic acid as crystals, filtering off the crystals, and neutralizing the mother liquor with NaOH to a pH of 6.8). 100 g. of sodium chloride were added to the starting solution and the solution was concentrated under reduced pressure at 65° C. Precipitated sodium sulfate was filtered off at the same temperature and washed with a small amount of hot saturated sodium chloride aqueous solution. 300 g. of crude crystals of anhydrous sodium sulfate were obtained. The filtrate (464 g.) was cooled to 21° C. and agitated for 5 hours. 57 g. of crude crystals of racemic sodium glutamate were precipitated.

The composition of said crude product was as follows:

|  | Percent |
| --- | --- |
| Racemic sodium glutamate dihydrate | 79.5 |
| Sodium sulfate | 0.98 |
| Sodium chloride | 12.1 |
| Adhered moisture | 7.2 |

From the above, it is noted that racemic sodium glutamate was obtained as crystals in a yield of 75% from a solution containing racemic sodium glutamate and sodium sulfate in the ratio of 1:6 by weight, and 96% of sodium sulfate in the solution was separated as crystals from said solution.

*Example 3*

After a solution containing racemic sodium glutamate dihydrate, sodium sulfate and sodium chloride in solid phase was agitated for five hours at 53° C., the saturated aqueous solution of these materials was prepared by filtering off undissolved solid materials at the same temperature. The composition of the filtrate was as follows:

|  | Percent |
|---|---|
| Racemic sodium glutamate | 8.44 |
| Sodium sulfate | 4.22 |
| Sodium chloride | 21.42 |

Four hundred and fifty-five grams of this solution were cooled to 15° C. and were agitated for 5 hours at the same temperature. Precipitated crude racemic sodium glutamate dihydrate (44.6 g.) and the mother liquor (405 g.) were analyzed and the following results were obtained.

| Crude racemic sodium glutamate dihydrate (44.6 g.): | Percent |
|---|---|
| Racemic sodium glutamate dihydrate | 80.6 |
| Sodium sulfate | 0.9 |
| Sodium chloride | 4.6 |
| Adhered moisture | 13.9 |
| Mother liquor (405 g.): |  |
| Racemic sodium glutamate | 2.16 |
| Sodium sulfate | 4.65 |
| Sodium chloride | 23.6 |

From the above, it is noted that racemic sodium glutamate was precipitated in 77.2% yield even if the content in the mother liquor is set aside, and further that sodium sulfate crystals are substantially absent from the precipitated crystals, the small amount in the analysis being that contained in the adhered mother liquor.

It is needless to say that a concentrated solution of racemic sodium glutamate, sodium sulfate and sodium chloride can be prepared by various means. For example, a solution containing a small amount of racemic sodium glutamate and a great amount of sodium sulfate may be concentrated by evaporation before or after the addition of sodium chloride in the amount sufficient for saturating the resultant concentrated solution with sodium chloride, thereby precipitating the excessive amount of sodium sulfate.

It is also needless to say that, although it is preferable to concentrate the solution to such an extent as to have the solution saturated with racemic sodium glutamate, the separation of racemic sodium glutamate from sodium sulfate can be effected advantageously according to the principle of the present invention, as long as the concentration of the starting solution is carried out to such an extent that the resultant concentrated solution becomes saturated with racemic sodium glutamate.

What we claim is:

1. A method for recovering substantially pure racemic sodium glutamate from an aqueous solution containing racemic sodium glutamate and sodium sulfate wherein sodium sulfate is contained in an amount of at least about 0.6 times the racemic sodium glutamate by weight and racemic sodium glutamate is contained in an amount of at least 2 grams to 100 grams of water at 10° C., said method comprising saturating said solution with sodium chloride at a temperature between about 50° C. and the boiling point of said solution, removing any solid phase which occurs in said solution, cooling said solution to a temperature of about 10° C., and recovering the crystals of substantially pure racemic sodium glutamate which precipitate.

2. A method for recovering substantially pure racemic sodium glutamate from an aqueous solution containing racemic sodium glutamate and sodium sulfate wherein racemic sodium glutamate is contained in an amount of at least 11 grams to 100 grams of water and sodium sulfate is contained in an amount of at least 7 grams to 100 grams of water at 50° C., said method comprising adding to said solution sodium chloride in an amount of at least 33 grams to 100 grams water at a temperature between about 50° C. and the boiling point of said solution, removing any solid phase from the solution, cooling said solution to about 10° C. and recovering precipitated crystals of substantially pure racemic sodium glutamate from the solution.

3. A method for recovering substantially pure racemic sodium glutamate from an aqueous solution containing racemic sodium glutamate and sodium sulfate wherein racemic sodium sulfate is at least about 0.6 times the racemic sodium glutamate by weight at 50° C., said method comprising adding to said solution sodium chloride in an amount of less than about 3 times the racemic sodium glutamate by weight at a temperature in the range of between about 50° C. and the boiling point of said solution, evaporating water from said solution so that the latter is saturated with sodium chloride, removing any solid phase which exists in said solution, cooling said solution to about 10° C., and recovering crystals of substantially pure racemic sodium glutamate which precipitate.

4. A method for recovering substantially pure racemic sodium glutamate from an aqueous solution containing racemic sodium glutamate and sodium sulfate wherein sodium sulfate is contained in an amount of less than about 0.6 times the racemic sodium glutamate by weight at 50° C. and wherein the racemic sodium glutamate is contained in an amount of at least 2 grams to 100 grams of water in said solution at 10° C., said method comprising adding sufficient sodium chloride to said solution at a temperature of between about 50° C. and the boiling point of said solution to saturate the latter, cooling said solution to about 10° C., and recovering the crystals of substantially pure racemic sodium glutamate which precipitate.

References Cited by the Examiner
UNITED STATES PATENTS 2,929,839  3/60  Hoglan _____ 260—544

OTHER REFERENCES

Mellor: Modern Inorganic Chemistry, pages 156–157 (1951).

Mellor: Modern Inorganic Chemistry, pages 238–239 (1951).

LEON ZITVER, *Primary Examiner.*